US012744484B2

(12) United States Patent
McLean et al.

(10) Patent No.: US 12,744,484 B2
(45) Date of Patent: Sep. 22, 2026

(54) CONTROLLER FOR A PERMANENT MAGNET MACHINE

(71) Applicant: Hamilton Sundstrand Corporation, Charlotte, NC (US)

(72) Inventors: Andrew McLean, Halesowen (GB); Parminder Sangha, Solihull (GB)

(73) Assignee: Hamilton Sundstrand Corporation, Charlotte, NC (US)

(*) Notice: Subject to any disclaimer, the term of this patent is extended or adjusted under 35 U.S.C. 154(b) by 273 days.

(21) Appl. No.: 18/600,450

(22) Filed: Mar. 8, 2024

(65) Prior Publication Data

US 2024/0313688 A1 Sep. 19, 2024

(30) Foreign Application Priority Data

Mar. 17, 2023 (EP) .................................... 23162738

(51) Int. Cl.
*H02H 7/08* (2006.01)
*H02P 29/024* (2016.01)

(52) U.S. Cl.
CPC ...... *H02P 29/024* (2013.01); *H02P 2207/055* (2013.01)

(58) Field of Classification Search
CPC .... H02P 29/024; H02P 2101/30; H02P 21/22; H02P 3/12
See application file for complete search history.

(56) References Cited

U.S. PATENT DOCUMENTS

| | | | | |
|---|---|---|---|---|
| 8,823,307 | B2 | 9/2014 | Gajic et al. | |
| 9,397,592 | B2 | 7/2016 | Kezobo et al. | |
| 11,128,251 | B1 | 9/2021 | Solodovnik et al. | |
| 11,509,255 | B2 * | 11/2022 | Popek | H02P 29/028 |
| 2001/0035688 | A1 | 11/2001 | Sawada et al. | |
| 2014/0001988 | A1 | 1/2014 | Kanzaki | |

FOREIGN PATENT DOCUMENTS

| | | | | | |
|---|---|---|---|---|---|
| CN | 102539988 | A | * | 7/2012 | |
| CN | 106470008 | A | | 3/2017 | |
| CN | 112217301 | A | * | 1/2021 | H02K 1/278 |
| CN | 111572348 | B | | 4/2021 | |
| CN | 115656871 | A | | 1/2023 | |
| JP | 2010068689 | A | | 3/2010 | |
| JP | 6965725 | B2 | * | 11/2021 | |

OTHER PUBLICATIONS

European Search Report dated Aug. 28, 2023 in connection with European Patent Application No. 23162738.1, 10 pages.

* cited by examiner

*Primary Examiner* — Karen Masih

(57) ABSTRACT

A controller for a permanent magnet machine, the controller configured to: monitor a characteristic value of power transfer to the permanent magnet machine; compare the monitored characteristic value to a characteristic threshold; and indicate a short circuit error in response to the monitored characteristic value meeting the characteristic threshold.

20 Claims, 6 Drawing Sheets

CONTROLLER FOR A PERMANENT MAGNET MACHINE

CROSS-REFERENCE TO RELATED APPLICATION AND PRIORITY CLAIM

This application claims priority under 35 U.S.C. § 119 to European Patent Application No. 23162738.1 filed on Mar. 17, 2023, which is hereby incorporated by reference in its entirety.

TECHNICAL FIELD

This disclosure relates to a controller for a permanent magnet machine. This disclosure also relates to an aircraft power system, an aircraft and a method.

BACKGROUND

Permanent magnet machines are used in many automotive, aerospace and industrial applications due their high power density and high efficiency as compared to alternative motor topologies. Permanent magnet machines may be surface permanent magnet machines, internal permanent magnet machines, or embedded permanent magnet machines.

The performance of the permanent magnet machine is typically controlled with a drive system. The machine has a stator with stator windings that are distributed to wrap around one or more stator teeth. A rotating field is generated by the stator windings.

The drive system may have safety features built in to protect the motor and drive system from faults that may occur during operation. A fault that may occur is a shorted turn in the windings. For example, the fault may occur due to insulation failure, vibrations in the machine, or manufacturing defects. High currents can flow in shorted turns which may lead to high temperatures in the windings and detrimental system effects. It is therefore important that such faults can be detected quickly. Responsive actions must be taken quickly and effectively upon detection of such faults.

SUMMARY

According to a first aspect, there is provided a controller for a permanent magnet machine, the controller configured to: monitor a characteristic value of power transfer to the permanent magnet machine; compare the monitored characteristic value to a characteristic threshold; and indicate a short circuit error in response to the monitored characteristic value meeting the characteristic threshold.

By monitoring the characteristic value of power transfer to or from the permanent magnet machine to determine a short circuit error, the short circuit error may be reliably detected without the need for additional hardware or complicated computation.

The controller may be configured to bring the machine to rest in response to the short circuit error being indicated.

The controller may be configured to physically disconnect the motor from a power source after bringing the motor to rest.

The characteristic value may comprise a current.

The current may comprise a total current in a DC power link.

The current may comprise a Q-axis current.

The characteristic threshold may relate to a characteristic current variance, wherein the controller is configured to indicate the short circuit error when a variance of the current exceeds the characteristic current variance.

The characteristic value may comprise a frequency component of the power transfer.

The controller may be configured to indicate the short circuit error in response to the frequency component being lower than the characteristic threshold.

The controller may be configured to control the permanent magnet machine to operate as a motor.

The characteristic value may comprise a motor torque.

The controller may be configured to control the permanent magnet machine to operate as a generator.

The characteristic value may relate to a current or torque ripple.

The permanent magnet machine may be a surface permanent magnet machine.

The permanent magnet machine may be an internal permanent magnet machine, or an embedded permanent magnet machine.

According to a second aspect, there is provided an aircraft power system comprising the controller according to any preceding claim and the permanent magnet machine.

The aircraft power system may comprise a DC power link and an inverter/rectifier, the inverter/rectifier configured to convert between DC power in the DC power link and AC power in the permanent magnet machine.

The aircraft power system may comprise any of the features described with respect to the first aspect.

According to a third aspect, there is provided an aircraft comprising the aircraft power system.

The aircraft may comprise any of the features described with respect to the first or second aspects.

According to a fourth aspect, there is provided a method of detecting a shorted turn fault in a permanent magnet machine, the method comprising: monitoring a characteristic value of power transfer to the permanent magnet machine; comparing the monitored characteristic value to a characteristic threshold; and indicating a short circuit error in response to the monitored characteristic value meeting the characteristic threshold.

The method may comprise any features or functional steps described with respect to the first to third aspects.

For example, the permanent magnet machine may be a surface permanent magnet machine. The permanent magnet machine may be an internal permanent magnet machine, or an embedded permanent magnet machine.

BRIEF DESCRIPTION OF THE DRAWINGS

Various examples will now be described, by way of example only, and with reference to the accompanying drawings, in which.

DETAILED DESCRIPTION

Figure 1:
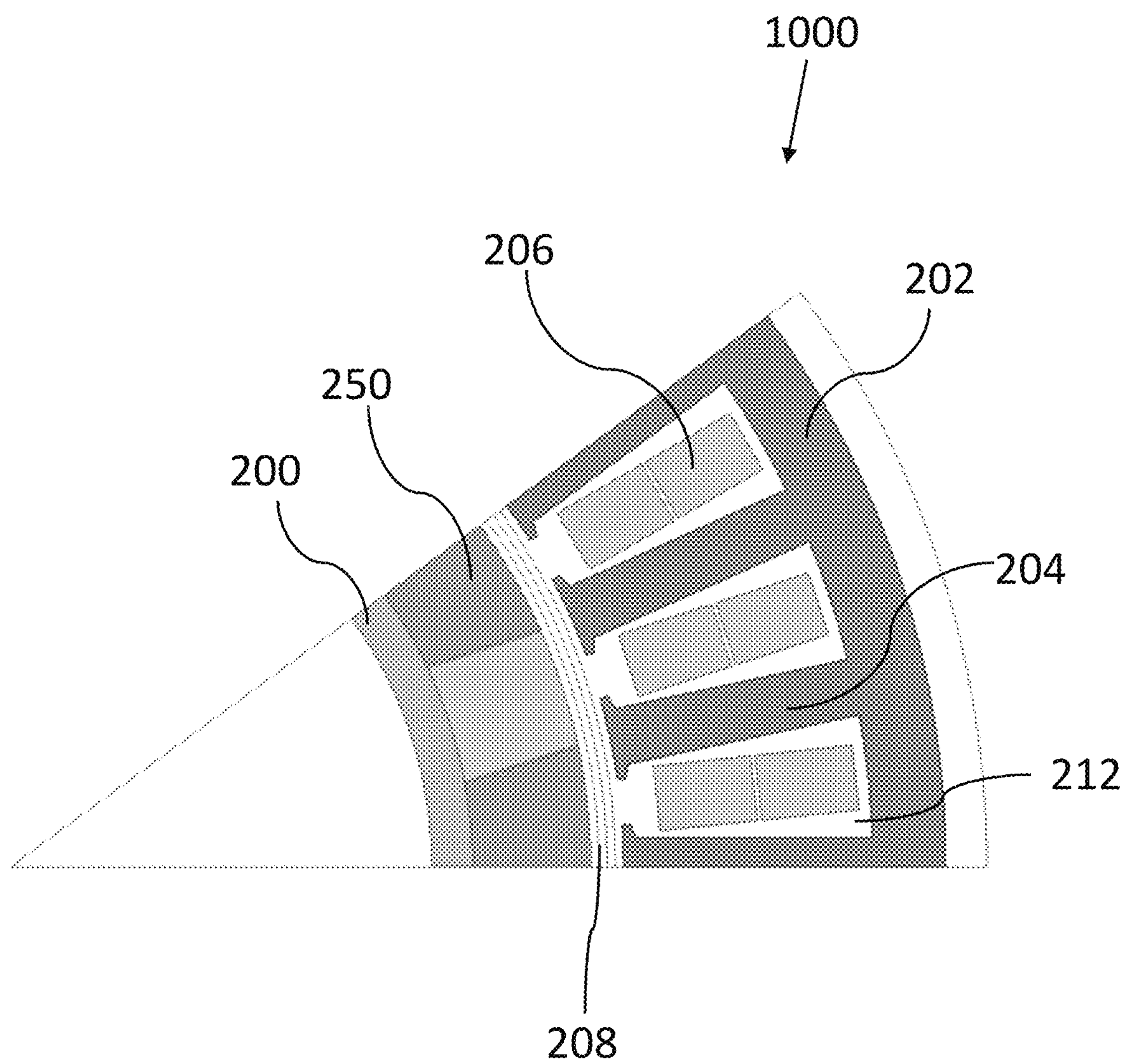
FIG. 1 shows a cross section of a surface permanent magnet motor arrangement with distributed windings.

Referring to FIG. 1, a cross section of a surface permanent magnet machine arrangement 1000 with distributed stator windings 206 is shown. In FIG. 1, part of the machine arrangement is shown which illustrates one pole pitch. In examples, the surface permanent magnet machine 1000 is a surface permanent magnet motor. In examples, the surface permanent magnet machine 1000 is a surface permanent magnet generator. In this example, the stator comprises integer slot/pole/phase. In examples, the stator may comprise fractional slot/pole/phase.

The permanent magnet machine arrangement 1000 comprises a rotor shaft 200. The rotor shaft is arranged to rotate relative to a stator 202.

A plurality of surface permanent magnets 250 are attached to the outer circumference of the rotor shaft 200. The magnets 250 are held in position with a retaining sleeve 208. The retaining sleeve 208 may be a composite sleeve. In examples, the retaining sleeve is provided in addition to securing means that directly secure the magnets 250 to the rotor shaft 200. In examples, the retaining sleeve 208 may be omitted and the magnets may be attached to the circumference of the rotor shaft 200 with securing means. The securing means may be adhesive. In most applications, the sleeve is required for safety and reliability reasons depending on the design and operating environment.

The magnets 250 are grouped in groups of three magnets 250 which form a pole. A plurality of magnetic poles are provided around the outer circumference of the rotor shaft 200 such that the magnetic poles form an annulus around the outer circumference of the rotor shaft 200.

The arrangement 1000 comprises a stator 202 which forms a housing and is the stationary part of the rotary system. The stator 202 is formed of iron. The stator 202 may also be formed of a different ferromagnetic metal. The stator 202 comprises a number of stator teeth 204 which extend towards the rotor shaft 200. Between the teeth 204 are stator slots 212.

The stator windings 206 are distributed to wrap around one or more stator teeth 204. A rotating field is generated by the stator windings 206. The stator windings 206 may consist of a few, or many turns in a coil.

When a shorted turn fault occurs, the shorted coil in the stator winding opposes the magnetic field. High currents flow in the shorted turn, which may lead to high temperatures in the windings and high severity system defects.

In examples, the surface permanent magnet machine may be a surface permanent magnet generator. In examples, the surface permanent magnet machine may be a surface permanent magnet motor-generator.

The rotor shaft 200 may be covered with a carbon fibre or metallic sleeve (not shown) to safely retain the magnets in position for mechanical integrity under operating conditions.

The surface permanent magnet machine may be used in aircraft or automotive applications where efficiency, reliability and size of the machine is particularly important.

In examples, the permanent magnet machine may be an internal permanent magnet machine or an embedded permanent magnet machine.

Figure 2:
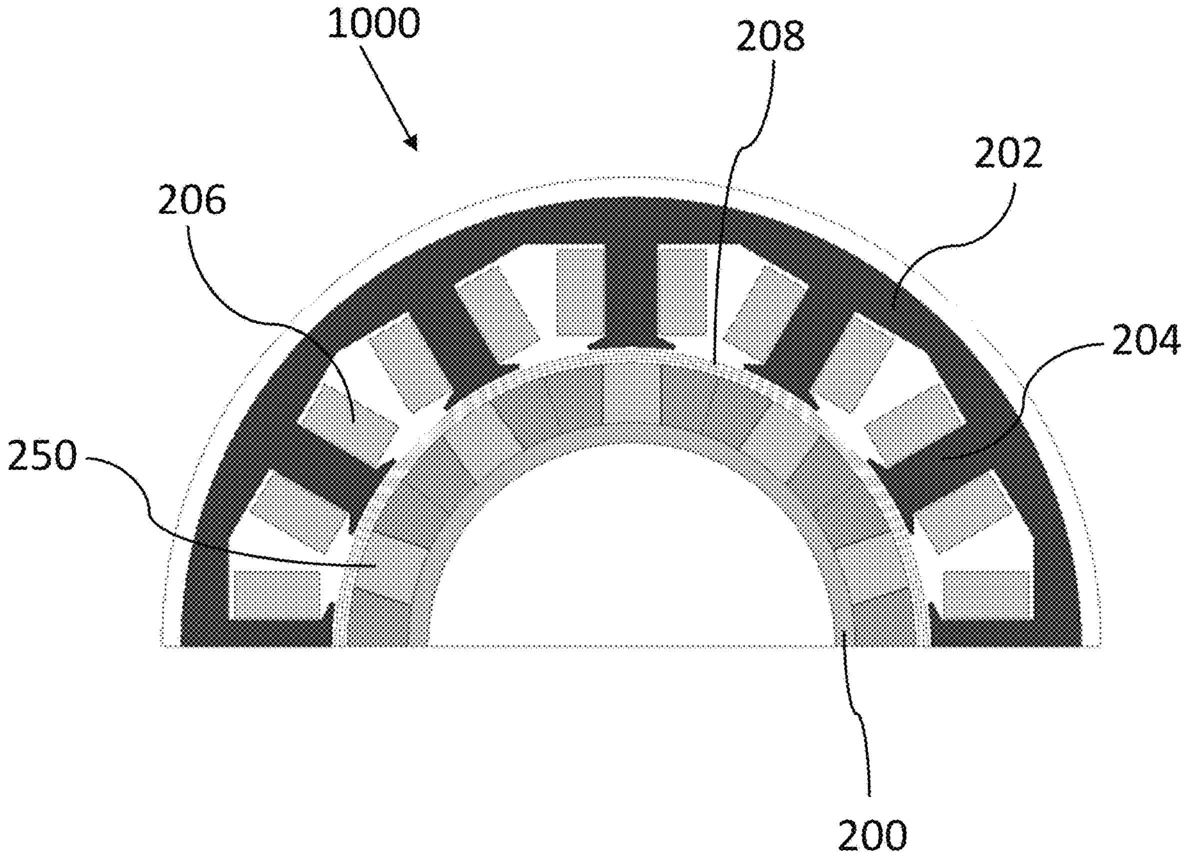
FIG. 2 shows a cross section of a surface permanent magnet motor arrangement with concentrated windings.

Referring to FIG. 2, a cross section of a surface permanent magnet motor arrangement 1000 with concentrated stator windings 206 is shown. The motor shown in FIG. 2 operates in substantially the same way as the motor shown in FIG. 1, except the windings 206 are concentrated around each stator tooth 204. Concentrated wound machines can also be constructed with different slot and pole combinations.

Figure 3:
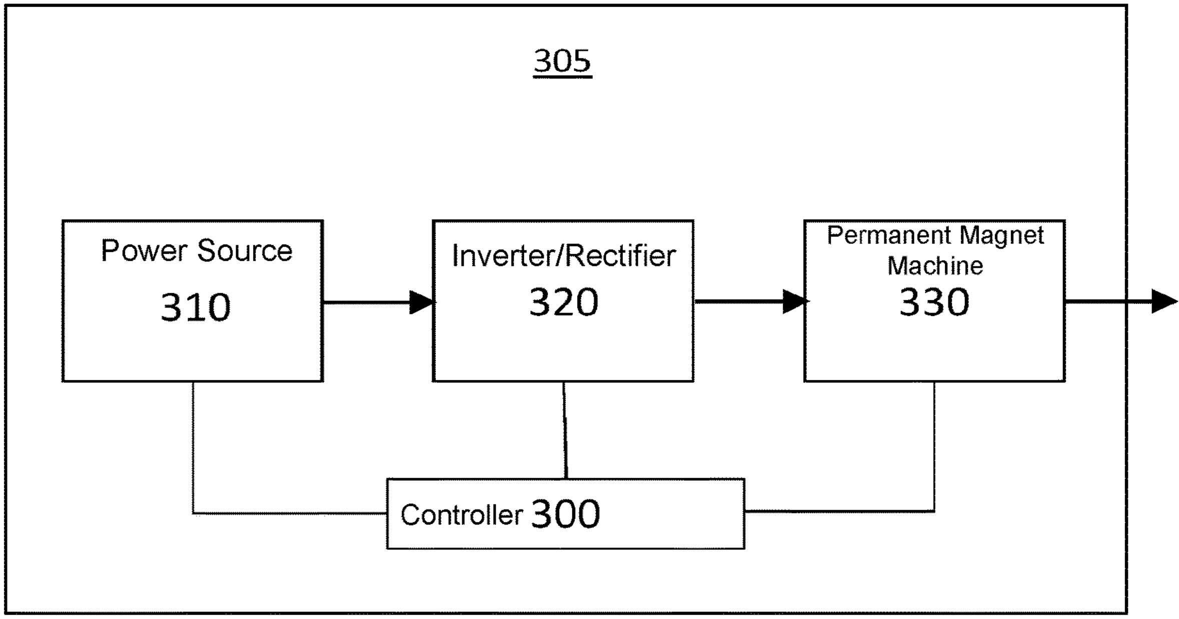
FIG. 3 shows a block diagram of a power system comprising a surface permanent magnet machine.

Referring to FIG. 3, a power system 305 comprising the surface permanent magnet machine is provided. The power system comprises a controller 300, a power source 310, an inverter/rectifier 320 and the surface permanent magnet machine 330. In examples, the power system 305 is an aircraft power system. In examples, the power system may comprise an internal permanent magnet machine or an embedded permanent magnet machine.

When the surface permanent magnet machine 330 acts as a motor, the power source 310 supplies power to the inverter/rectifier 320. The inverter/rectifier 320 receives DC power from the power source 310 and converts the power into AC power (e.g. three phase AC power), with the inverter/rectifier 320 acting as an inverter. The AC power is output to the machine 330 via the machine windings. The inverter/rectifier is configured to convert between DC power in the DC power link and AC power in the surface permanent magnet machine.

The machine 330 receives the power from the inverter/rectifier. The machine 330 provide an output drive torque, for example, to provide aircraft propulsion or to move an aircraft control surface.

The controller 300 is configured to control operation of the components of the power system 305. In particular, the controller 300 is configured to control power supply from the power source 310 to the rectifier/inverter. The controller 300 is further configured to control the rectifier/converter 320 to convert the DC power to AC power. The controller 300 is configured to control supply of the AC current to the machine 330 and to control the output drive torque of the machine 330.

The controller 300 is further configured to detect a short circuit error fault in the surface permanent magnet machine 330. Machine behaviour changes when a shorted turn is present. Changes in characteristic values of power transfer to the surface permanent magnet machine 330 result in short circuit error faults in the windings of the machine 330 being detectable. The controller 300 is configured to monitor a characteristic value of power transfer in the power system 305 and to compare the monitored characteristic value to a characteristic threshold in order to identify such faults.

The characteristic value may comprise a current, for example a total DC current supplied from the power source 310 to the inverter rectifier 320 and/or an input current into the machine 330. The characteristic value may additionally or alternatively comprise a Q-axis current. The characteristic value may comprise a frequency component of a value relating to power transfer or a variation in a value relating to power transfer.

When the controller 300 is configured to control the surface permanent magnet machine to operate as a motor, the characteristic value may comprise a motor torque.

In examples, the controller 300 is configured to control the surface permanent magnet machine 330 to operate as a generator, wherein an external component drives the machine 330 to produce AC current, which is converted to DC current by the inverter/rectifier 320 acting as a rectifier. In such examples, the characteristic value may comprise an output current from the rectifier 320. When the surface permanent magnet machine 330 acts as a generator, the power source 310 may be replaced by an energy storage (not shown). The characteristic value may be the DC current flowing from the rectifier 320 to the energy storage.

Figure 4:
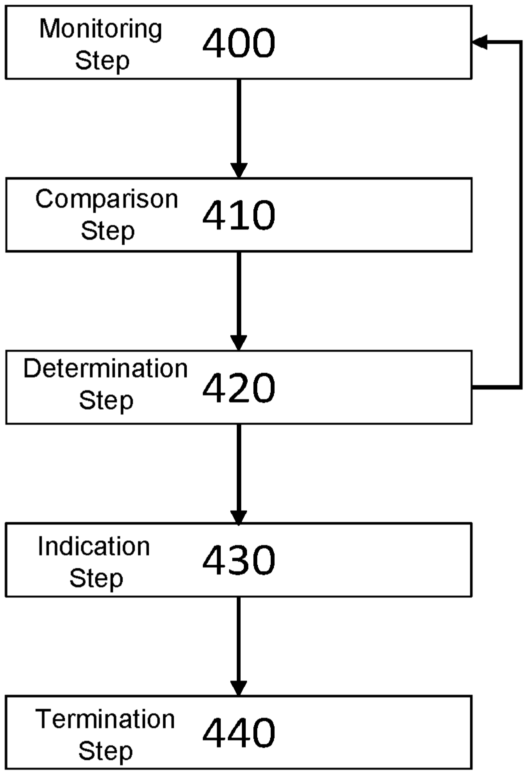
FIG. 4 shows a flow diagram of the process steps of the controller of a power system for a surface permanent magnet machine.

Referring to FIG. 4, the process steps of the controller 310 (when the surface permanent magnet machine 330 acts as a motor) detecting shorted turns in use are shown.

In the first instance, the controller 300 monitors a characteristic value of power transfer to the surface of the permanent magnet machine at the monitoring step 400. The characteristic value may be a characteristic of the input value of power transfer.

In examples, the monitoring step 400 may comprise monitoring a characteristic value of power transfer from the surface permanent magnet machine 330, i.e. a characteristic of the output value of power transfer where the machine operates as generator.

Next, at comparison step 410, the controller 310 will compare the monitored characteristic value of power transfer to a characteristic threshold. The characteristic threshold may be fixed such that it is predetermined for the system. In examples, the characteristic threshold may be selectable by a user. The characteristic threshold may be selected prior to, or during, operation of the permanent magnet machine. In examples, the characteristic threshold may be automatically selected based on operational parameters of the machine.

At determination step 420, the controller 310 determines whether the characteristic value of power transfer to or from the surface permanent magnet machine meets the characteristic threshold of power transfer. If the characteristic value of power transfer does not meet the characteristic threshold, the controller 300 will revert to the monitoring step 400, i.e. it operates in the no-fault condition. If the characteristic value of power transfer does meet the characteristic threshold, the controller 300 will proceed to indication step 430. This is the fault condition of the controller 300.

At indication step 430, in response to determining that the monitored characteristic value of power transfer meets the characteristic threshold, the controller 310 indicates that there is a short circuit error in the system. By monitoring power transfer and comparing to a characteristic threshold, any short circuit error may be reliably detected. There is no need for additional hardware or complex computation, making the system less complex and more reliable.

At termination step 440, the controller 310 brings the machine to rest in response to the short circuit error being indicated. In examples, the controller 310 is configured to physically disconnect the machine. This means that further damage to the machine in the presence of a shorted turn fault will be avoided.

The value of machine power transfer being detected may comprise: input current; output current; DC link power; Q-axis current; output torque; torque ripple; and/or current ripple.

The characteristic threshold may relate to an absolute maximum or minimum value of current, power or torque. A short circuit error is indicated if the monitored characteristic value exceeds the maximum value or if is less than the minimum value.

Torque ripple and current ripple relate to the variance of current or torque with time or rotation of the surface permanent magnet machine. The characteristic threshold may relate to a characteristic variance of torque or current. A short circuit error is indicated by the controller when the variance of torque or current exceeds the characteristic variance.

The presence of a shorted turn fault or short circuit error in the machine changes the balance of a flux distribution inside the machine leading to measurably different characteristics of power transfer in the machine, for example an increased torque ripple in the output torque from the machine. In examples, the change in torque ripple may be measurable in the DC link power as a power ripple. In examples, the DC link power may be estimated in the power system using monitored values for the DC link voltage and current.

For in some operating conditions, the motor output torque, torque ripple, Q-axis current ripple and/or DC link power can be estimated from the input or output current demand. In examples, power characteristic threshold limits (for example Q-axis current ripple limits) are to be safely set within the power system for healthy operation. When the threshold limits are met, a shorted turn fault or short circuit error is indicated by the controller.

Figure 5:
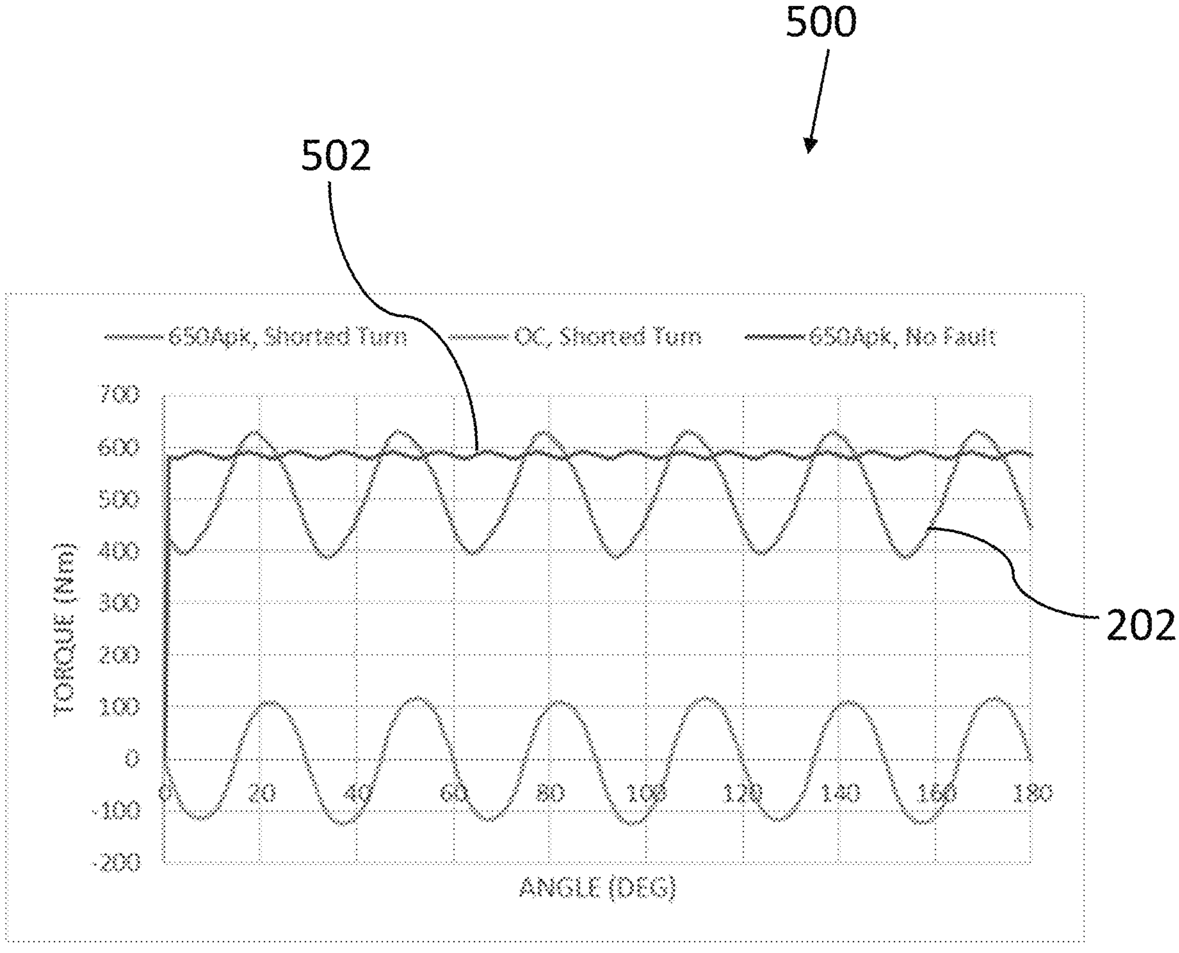
FIG. 5 shows a graph that illustrates the effect on motor output torque in a fault and a no fault condition.

FIG. 5 shows a graph 500 which illustrates the effect on total motor output torque in a fault and a no fault condition in a surface permanent magnet machine.

The graph 500 shows output torque of the surface permanent magnet machine as a function of angle as the machine rotates. The controller 330 monitors the characteristic value of torque ripple as torque varies with angle of rotation. The characteristic threshold relates to a characteristic torque ripple (which may also be known as the torque variance).

In the no fault condition, the monitored motor output torque (shown as line 502) is generally constant as a function of angle as the machine rotates. There is minor variance in the output torque with rotation, such that there is minor torque ripple at 502. However, as determined by the controller, the torque ripple does not meet the characteristic threshold of torque ripple. The controller 300 determines that no shorted turn fault is present and continues to monitor the motor output torque.

In the fault condition, there is an increase in monitored torque ripple in the motor output torque (shown as line 504). The variance of torque with rotation is significantly greater than the variance of the torque in the no fault condition. In the fault condition, the monitored torque ripple meets the characteristic threshold of torque ripple.

In use, the controller 300 compares the monitored torque ripple shown by line 504 to the characteristic threshold of torque ripple. The controller 300 determines that the monitored torque ripple meets the threshold and indicates that there is a shorted turn error in the surface permanent magnet machine.

Further, in the fault condition, the controller may identify that the average torque reduces when there is a shorted turn fault present in the machine. As shown in graph 500, the average output torque is lower in the fault condition 504 as compared to the average output torque in the no fault condition.

In examples, the effect of an increase in torque ripple shown in FIG. 5 may be monitored as a function of time, with corresponding effects. The controller 330 will indicate that there is a shorted turn fault in the machine if the variation of torque as a function of time meets the torque ripple characteristic threshold.

Figure 6A:
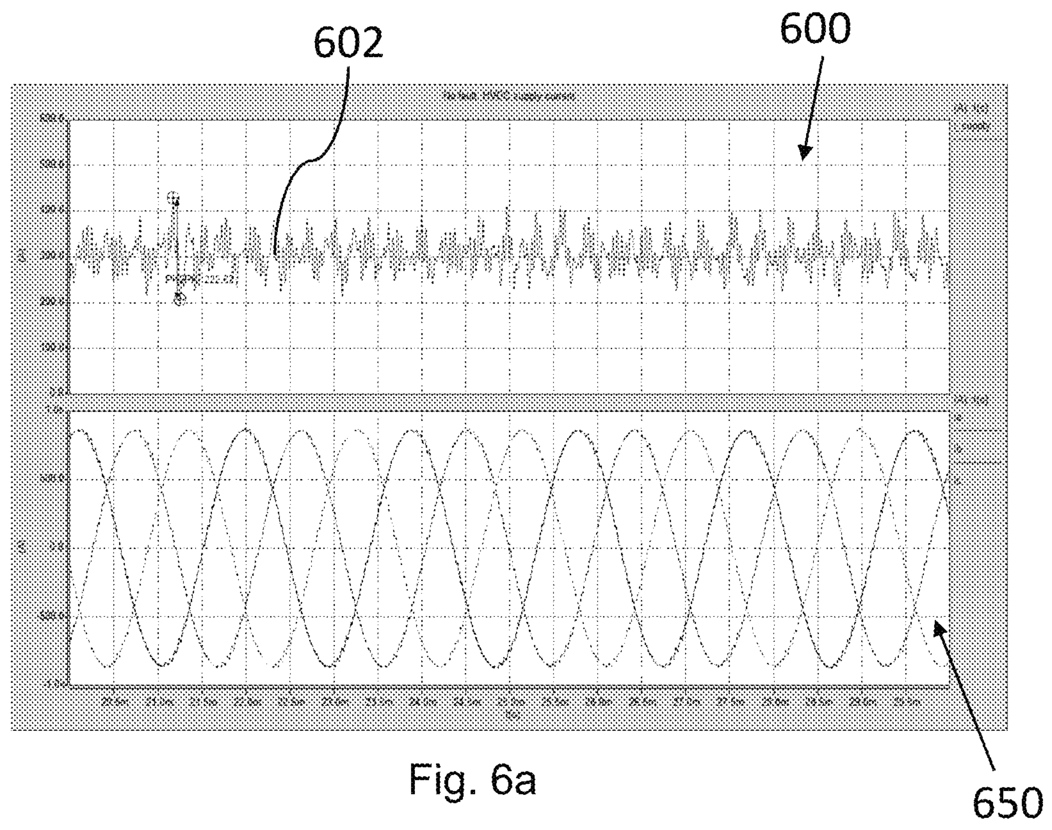
FIG. 6*a* shows a graph which illustrates input current as a function of time in a no fault condition.

FIG. 6*a* shows a graph 600 which illustrates input current as a function of time in a no fault condition. The monitored current value (shown as trace 602) is the monitored characteristic value. The characteristic threshold value relates to the minimum and/or maximum current values.

In the no fault condition, the monitored input current peak to peak values are relatively low, with some typical oscillations in amplitude. As determined by the controller 300, the monitored input current values do not meet the characteristic threshold and, as such, no shorted turn fault is detected or indicated.

In examples, the expected input current trace may be used to determine or set the characteristic threshold value to which the controller 300 compares the monitored values.

Figure 6B:
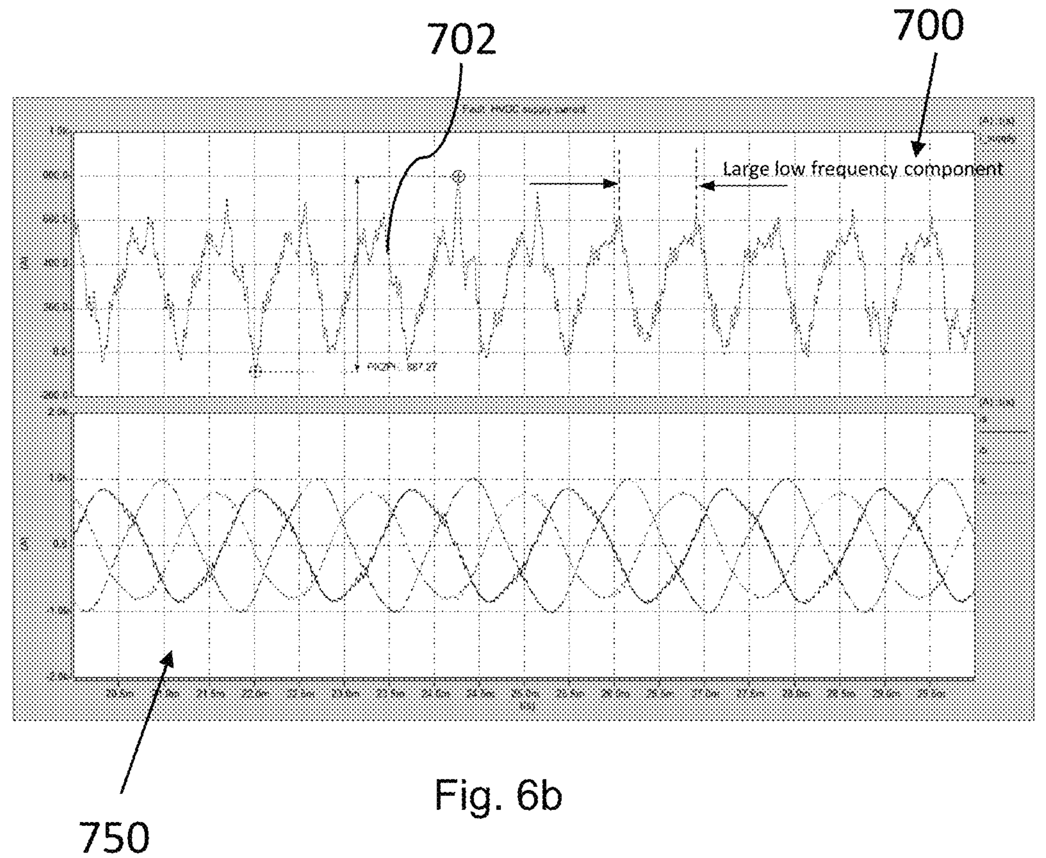
FIG. 6*b* shows a graph which illustrates input current as a function of time in a fault condition.

FIG. 6*b* shows a graph 700 which illustrates input current as a function of time in a fault condition. The input voltage is the same as for the graph 600 shown in FIG. 6*a*. The monitored current value (shown as trace 702) is the characteristic value.

The presence of a shorted turn fault causes large currents to be drawn in as part of the machine cycle. This means that the monitored current value has a significantly larger amplitude of oscillations as compared to the no fault condition.

In use, the controller 300 compares the monitored current trace 702 to the characteristic threshold. The monitored current trace values 702 are determined by the controller 300 to meet the characteristic threshold. The controller 300 indicated that there is a shorted turn fault.

In examples, similar patterns in output current are shown for when the machine operates as a generator.

In examples, the Q-axis current may be the monitored characteristic value of power. The Q-axis current may be calculated from the three-phase current, as shown in graphs 650 and 750 for the no fault and fault conditions respectively.

The controller may compare the characteristics of the monitored characteristic values for changes that differ from the expected trace in a no fault condition. For example, the controller may indicate a short circuit error in response to the spread of the monitored ripple changing, a change in the frequency of oscillations and/or a distortion in the expected shape of the waveform.

In examples, the surface permanent magnet machine discussed above may be replaced with an internal permanent magnet machine or an embedded permanent magnet machine.

Various aspects disclosed in the various examples may be used alone, in combination, or in a variety of arrangements not specifically discussed in the examples described in the foregoing and this disclosure is therefore not limited in its application to the details and arrangement of components set forth in the foregoing description or illustrated in the drawings. For example, aspects described in one example may be combined in any manner with aspects described in other examples. Although particular examples have been shown and described, it will be obvious to those skilled in the art that changes and modifications may be made without departing from the invention in its broader aspects. The scope of the following claims should not be limited by the examples set forth in the examples, but should be given the broadest reasonable interpretation consistent with the description as a whole.

The invention claimed is:

1. An apparatus comprising:

a controller for a permanent magnet machine, the controller configured to:

monitor a characteristic value of power transfer to the permanent magnet machine;

compare the monitored characteristic value to a characteristic threshold;

indicate a short circuit error in response to the monitored characteristic value meeting the characteristic threshold; and bring the permanent magnet machine to rest in response to the short circuit error being indicated.

2. The apparatus according to claim 1, wherein the controller is configured to physically disconnect the permanent magnet machine from a power source after bringing the permanent magnet machine to rest.

3. The apparatus according to claim 1, wherein the characteristic value comprises a current.

4. The apparatus according to claim 3, wherein the current comprises a total current in a DC power link.

5. The apparatus according to claim 3, wherein the current comprises a Q-axis current.

6. The apparatus according to claim 3, wherein the characteristic threshold relates to a characteristic current variance, and wherein the controller is configured to indicate the short circuit error when a variance of the current exceeds the characteristic current variance.

7. The apparatus according to claim 1, wherein the characteristic value relates to a frequency of the power transfer.

8. The apparatus according to claim 7, wherein the controller is configured to indicate the short circuit error in response to the frequency being lower than the characteristic threshold.

9. The apparatus according to claim 1, wherein the controller is configured to control the permanent magnet machine to operate as a motor.

10. The apparatus according to claim 9, wherein the characteristic value comprises a motor torque.

11. The apparatus according to claim 1, wherein the controller is configured to control the permanent magnet machine to operate as a generator.

12. The apparatus according to claim 1, wherein the permanent magnet machine is a surface permanent magnet machine.

13. An aircraft power system comprising:

a permanent magnet machine; and a controller configured to:

monitor a characteristic value of power transfer to the permanent magnet machine;

compare the monitored characteristic value to a characteristic threshold;

indicate a short circuit error in response to the monitored characteristic value meeting the characteristic threshold; and bring the permanent magnet machine to rest in response to the short circuit error being indicated.

14. The aircraft power system according to claim 13, further comprising a DC power link and an inverter/rectifier, the inverter/rectifier configured to convert between DC power in the DC power link and AC power in the permanent magnet machine.

15. An aircraft comprising the aircraft power system of claim 13.

16. A method of detecting a shorted turn fault in a permanent magnet machine, the method comprising:

monitoring a characteristic value of power transfer to the permanent magnet machine;

comparing the monitored characteristic value to a characteristic threshold;

indicating a short circuit error in response to the monitored characteristic value meeting the characteristic threshold; and bringing the permanent magnet machine to rest in response to the short circuit error being indicated.

17. The method according to claim 16, wherein the characteristic value relates to a frequency of the power transfer.

18. The method according to claim 16, wherein:

the characteristic value comprises a current;

the characteristic threshold relates to a characteristic current variance; and the short circuit error is indicated when a variance of the current exceeds the characteristic current variance.

19. The aircraft power system according to claim 13, wherein the characteristic value relates to a frequency of the power transfer.

20. The aircraft power system according to claim 13, wherein:

the characteristic value comprises a current;

the characteristic threshold relates to a characteristic current variance; and the controller is configured to indicate the short circuit error when a variance of the current exceeds the characteristic current variance.

* * * * *